United States Patent [19]

Hudson

[11] 4,239,267
[45] Dec. 16, 1980

[54] INTERNAL-BELLOWS, PRESSURE-BALANCED, ANGLED-FLOWPATH EXPANSION JOINT

[75] Inventor: Roger D. Hudson, Baton Rouge, La.

[73] Assignee: The Dow Chemical Company, Midland, Mich.

[21] Appl. No.: 74,179

[22] Filed: Sep. 10, 1979

[51] Int. Cl.³ .............................................. F16L 51/02
[52] U.S. Cl. ............................. 285/228; 285/DIG. 2
[58] Field of Search .............. 285/227, 228, 226, 299, 285/300, 301, DIG. 2, 179

[56] References Cited

U.S. PATENT DOCUMENTS 3,198,558  8/1965  Braden ................................ 285/228
3,241,868  3/1966  Soderberg ........................... 285/228
3,359,016  12/1967  Sarlls, Jr. ............................ 285/228
3,488,949  1/1970  Jackson ........................... 285/228 X Primary Examiner—Thomas F. Callaghan
Attorney, Agent, or Firm—M. W. Barrow

[57] ABSTRACT

Disclosed is an expansion joint principally for use on pipelines carrying pressurized, hot (or cold) fluids such as steam. The joint is for use at a point in the line where a change in direction must be made by flowing fluid and/or pipeline. By the proper combination of three pipes, location of holes in these pipes and flange-like pieces, an expansion joint is created which is not only pressure-balanced and of the internal-bellows type but, requires only two bellows to be such an expansion joint.

4 Claims, 3 Drawing Figures

INTERNAL-BELLOWS, PRESSURE-BALANCED, ANGLED-FLOWPATH EXPANSION JOINT

BACKGROUND OF THE INVENTION

This invention relates to an expansion joint which employs bellows which are externally pressurized, which is pressure-balanced, and which is located in an angled-flowpath.

Several needs have persisted in dealing with the expansion and contractions of conduits or pipelines through which hot or cold fluids are flowed, e.g. steam and chemical process liquids and gases. Simple bellows type joints have been made which are inserted in the conduit and provided thermal contraction and expansion leeway for the conduit by correspondingly expanding or contracting. These have proven most unsatisfactory, particularly in lines through which high pressure fluids are flowed. In these designs, the pressure is applied internally to the bellows and tends to expand the bellows outwardly. It is known that a bellows can withstand more pressure exerted externally upon it than it can withstand when the pressure is exerted internally. Hence, the pressure ratings of an internally pressurized bellows is less than that of an externally pressurized bellows. Also when a crack develops in an internally pressurized bellows catastrophic failure often occurs as the crack quickly erupts into a gaping hole resulting in large and possibly dangerous releases of the fluid within the expansion joint. For this reason, shields are often placed over the expansion joints, or externally pressured bellows expansion joints are employed. Representative of the externally pressurized expansion joints are the X-Press Expansion Joint produced by Pathway Bellows, Inc., of El Cajon, California. These are for use, however, in a straight-line pipeline, not at an angled expansion joint where it is necessary to change the straight-line fluid flow to an angled flow much as does a standard L, T, or Y pipe connection. Providing a externally pressurized expansion joint at such an angled flowpath is one of the objects of this invention.

Another need which has existed in the past has been to produce a bellows-type expansion joint which reduces the massive supporting and anchoring system required for most expansion joints. This problem has been essentially eliminated in straight-line flow by so called pressure-balanced expansion joint. Representative of such straight-line bellows-type expansion joints which are also externally pressurized are (1) the pressure compensated bellows joint disclosed in Soderberg, U.S. Pat. No. 3,241,868 (May 22, 1966) and (2) X-Press II Expansion Joint manufactured by Pathway Bellows, Inc., of El Cajon, California. Both of these pressure compensated, bellows-type expansion joints suffer from several drawbacks, however. For example, they require three bellows, they require many interrelated parts which are expensive and complicated. Further, they require a balancing bellows which must be made with a cross-sectional area which is twice the cross-sectional area of the two on line pipe size bellows in order to achieve the desired pressure-balance inside the joint. This diameter ratio limitation adds to the complicating factors inherent in these pressure-balanced, external-pressure bellows expansion joints. However, their biggest drawback is that they are unsuited for anything but straight line pipe runs at the point where the joint is located and they are not adaptable for location at the point where the pipeline flow must angle away from a straight-line run. The present invention provides a bellows-type expansion joint which is pressure-balanced, is externally pressurized, and can be located at a point in the flow line where the flow line must suddenly deviate from a straight-line flow.

The state of the art at the time the present invention was made for a bellows-type, pressure-balanced expansion joint for an angled flow path was still rather crude. Generally, internal pressurization of the bellows was still employed, heavy outside tie rods were required to balance the pressure of two bellows, and heavy reinforcing was required for the tie rods.

SUMMARY OF THE INVENTION

The present invention is an internal-bellows, pressure-balanced expansion joint which can be located in a fluid stream flowpath at a point where the flowpath must be deviated or angled away from a straight-line flowpath.

The expansion joint comprises a first conduit member, a second conduit member, a third conduit member, first and second annular end members, first and second annular support rings, and a first and a second annular flexible bellows.

The first conduit member is closed off at one end. It has flow-slots cut in an annular section of it so that pressurized fluid, gas or liquid, hot or cold, can flow from the non-closed off end of the conduit through and out of the conduit through the flow slots. Or the the flow can be vice-versa.

The second conduit is a section of pipe which has a larger diameter than the first conduit and is fitted concentrically around that portion of the first conduit wherein the flow slots are located. Each end of the second conduit extends axially past the flow slots in the first conduit. The diameter of the second conduit is sufficiently greater than the diameter of the first conduit, and the axial extension of each end of the second conduit extends sufficiently far enough past the flow slots in the first conduit, so that the annular chamber formed between the two conduits is sufficiently large on both sides of the flow slots to insure that a bellows can be installed in this chamber on either side of the flow slots without (1) extending axially inward into that part of the chamber existing radially outward from the flow slots, or (2) extending axially outward past the ends of the second conduit. The closed end of the first conduit extends axially past the end of the second conduit.

The third pipe or conduit member is sealably connected to the second conduit member at a location which is substantially radially outward from the section of the first conduit containing the flow slots. An opening in that part of the wall of the second conduit provides fluid communication between the interior of the third conduit and the interior of the first conduit, and between the interior of the mid-section of the second conduit and the flow slots in the walls of the first conduit. The normal flow of the liquid to be transferred by the conduits can be from the first conduit to the third or vice versa, but the expansion joint is effective either way. The third conduit extends from the second conduit at an angle in the same manner that a L, T, or Y pipe connection would.

The first and second annular end members are rigidly and sealably connected at or near the ends of the second conduit member. They extend sufficiently inwardly toward the first conduit until only small gaps remain between the first conduit and the first and second annular end members. These gaps provide a slow and controlled escape valve or path for fluid normally flowing between the first and third conduit members should one or both of the bellows defined below rupture.

The expansion joint has first and second annular support rings rigidly and sealably connected to and around said first conduit member, one on each side of the section of said first conduit containing the flow slots. Then there is a first annular end member and a first annular support ring axially on one side of the section in said first conduit containing the flow slots, while on the other side of said section there is a second annular end member and a second annular support ring. The support rings are located between the flow slots and the end members. The support rings are spaced sufficiently apart from their respective end members, as are said first and second conduits, so that an annular bellows can be located in the annular chamber defined by said first ring support, said first end member, said first conduit, and said second conduit, and a second annular bellows can be installed in the annular chamber defined by said second ring support, said second end member, said first conduit, and said second conduit. The respective annular ring support member for said first annular end member is the first annular ring support member. Therefore, it is located on the closed-end side of said first conduit spaced between the section of said first conduit containing said flow slots and said first end member. The respective annular ring support member for said second annular end member is the second annular ring support member. Therefore, it is located on the end opposite the closed-end side of said second conduit spaced between the second end member and that end of the section of said first conduit containing said flow slots which is opposite the closed-end of said first conduit.

Both of said annular support rings extend radially outward from said first conduit member until their respective peripheries contact the interior wall of said second conduit to form slidable contact surfaces to accommodate movement of said first conduit with respect to said second conduit member.

A first, annular, flexible bellows is fitted in the annular open space defined by said first and second conduits, said first annular end member, and said first annular support ring member. One end of said first bellows is sealably connected to said first annular end member, and the other end is sealably connected to said first annular support ring member.

Ordinarily, part of the pressurized fluid normally flowing between said first and third conduits, leaks through said slidable contacting surfaces and thereby pressurize the external surfaces of said first bellows.

Similarly, a second, annular, flexible bellows is located on the other side of that section of said first conduit containing said flow slots. That is, said second bellows is fitted in the annular space defined by and in between said first conduit, said second conduit, said second annular end member, and said second annular ring supports member. One end of said annular bellows is sealably connected to said second annular end member while its other end is sealably connected to said second annular ring support member.

An alternative invention to that described above is one wherein the same members are used with the exception that said first conduit is not closed at one end, but rather continues on. Hence, this configuration would form a pressure-balanced, internal bellows angled expansion joint located in a conduit or pipeline at a point where a take-off or input line is located.

This invention will be further understood by reference to the drawings and the detailed description of the preferred embodiment given below.

DETAILED DESCRIPTION OF THE PREFERRED EMBODIMENTS

Figure 1:
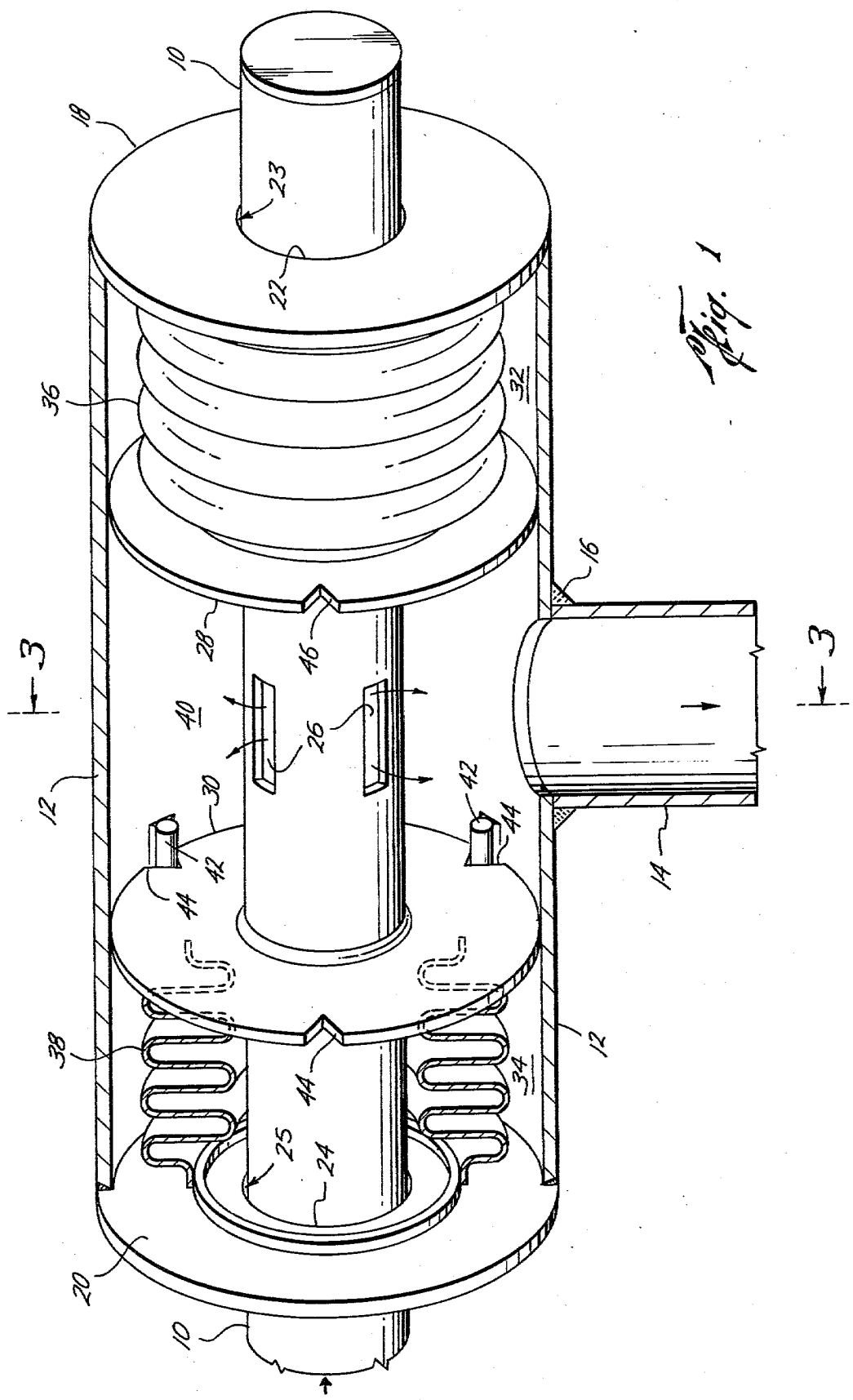
FIG. 1 is an isometric view of a preferred embodiment of the invention, said view being partially sectional, partially broken away, and partially diagrammatic.
Figure 2:
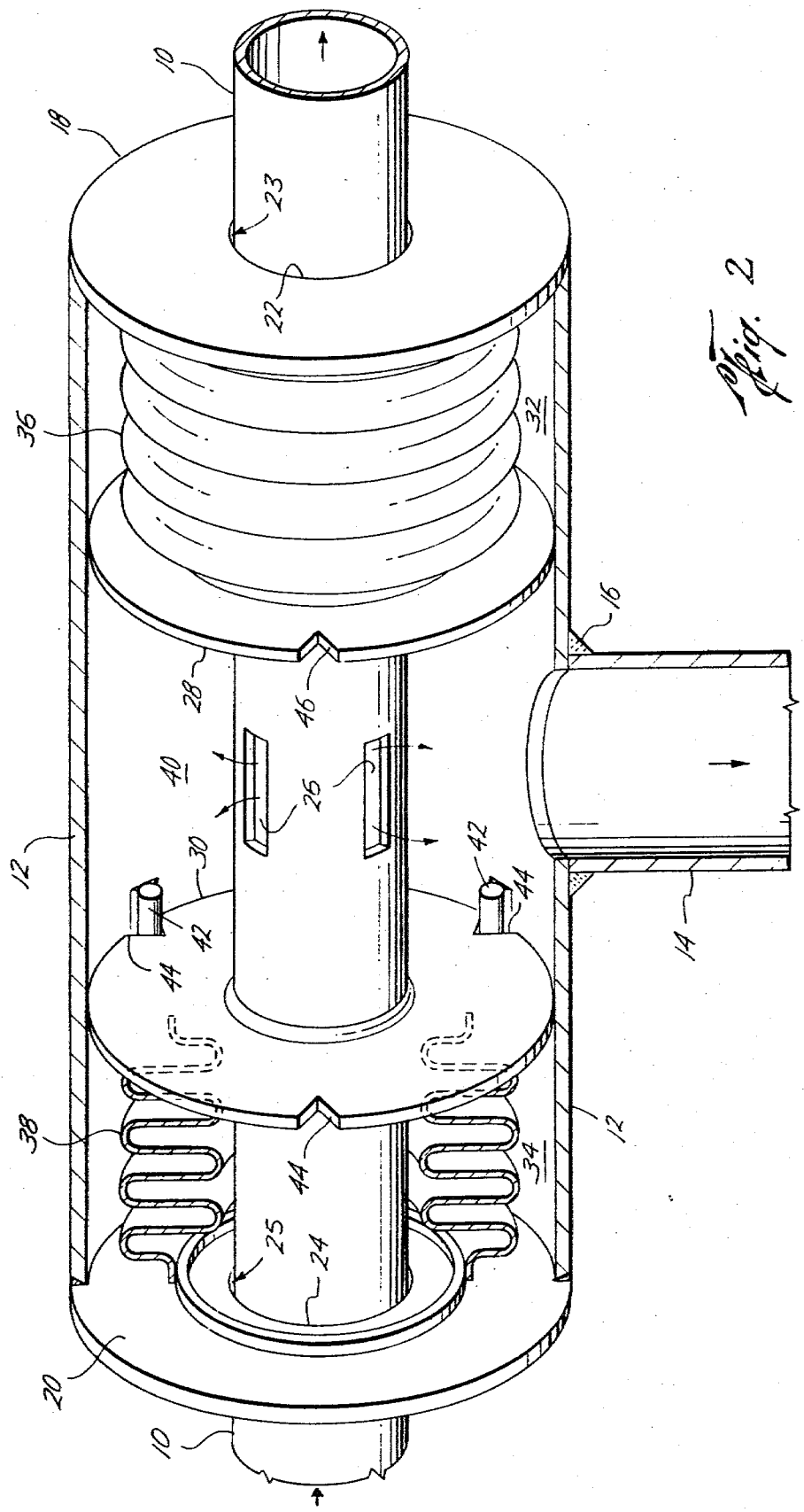
FIG. 2 is an isometric view of an alternate embodiment of the invention, said view being partially sectional, partially broken away, and partially diagrammatic, and said alternate embodiment differing only from that of the preferred embodiment of FIG. 1 in that pipe 10 in FIG. 2 is not closed off at its right end as is pipe 10 in FIG. 1.
Figure 3:
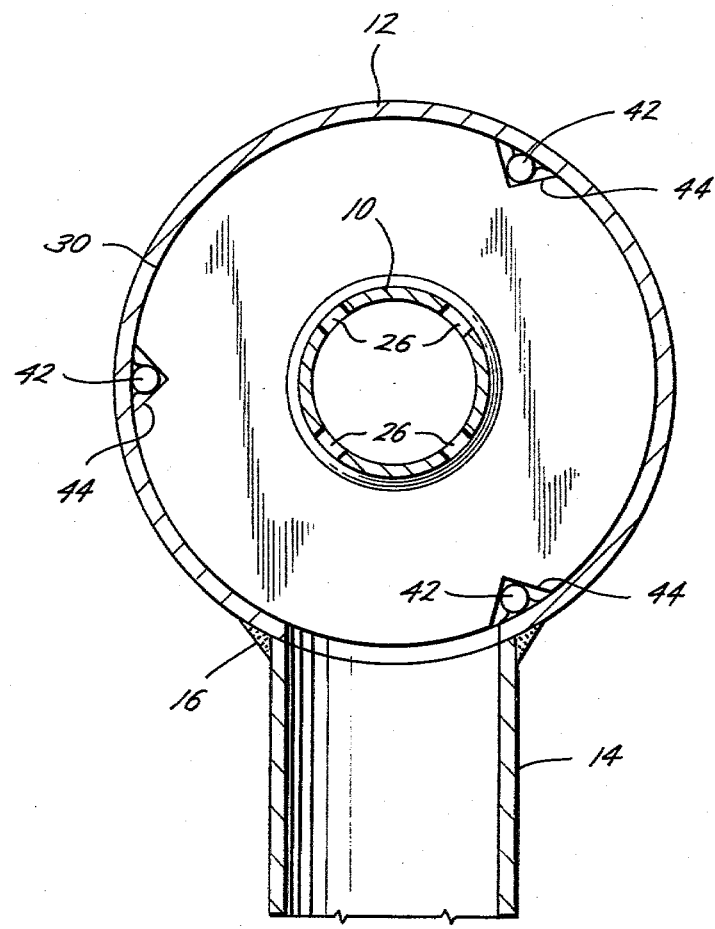
FIG. 3 is a sectional view of the invention taken along the line 3—3 shown in both FIG. 1 and FIG. 2.

Referring to the drawings, like parts will be referred to by the same reference numbers. The difference between the embodiment shown in FIG. 1 and the one shown in FIG. 2 is that steel pipe 10 is not closed off at its right end.

Pipe 10 is interior to and concentric with steel pipe 12. Steel pipe 14 is sealably welded by welds 16 to a hole cut in pipe 12 so that there can be fluid communication between the interiors of pipe 12 and pipe 14 without leakage at welds 16.

At each end of pipe 12 is sealably welded a steel end plate 18 and 20. These two steel plates extend perpendicularly inwardly toward pipe 10, but they do not reach it. Rather, near pipe 10, end plates stop, leaving annular holes 22 and 24 which are large enough to allow pipe 10 to freely move through them and also to have a discrete open annular gaps 23, 25 between the exterior of pipe 10 and the interior edge of annular end plates 18 and 20. The purpose and sizing of annular gaps 23 and 25 will be discussed below. At this point in the description, however, it can be seen that pipe section 12 in combination with end plates 18, 20 are similar in shape to a greatly enlarged cylindrical tin can with holes cut in each end so that pipe 10 can freely slide back and forth through it.

Flow slots 26 are cut in that section of pipe 10 which is approximately midways inside pipe 12. Flow slots 26 provide fluid communication between the interiors of pipe 10, pipe 12, and pipe 14. In FIG. 2 the fluid, which can be liquid or gas, is shown entering pipe 10 at its left end, flowing out of flow slots 26 into the center section of pipe 12, and then flowing from this center section of pipe 12 on through pipe 14. The invention works just as well if this flow is reversed. Similarly in the embodiment of FIG. 2, the flow can be reversed, and in fact, the flow into the apparatus can be from any two of the three flow parts; i.e., the left end of pipe 10, the right end of pipe 10, and pipe 14. Further this invention encompasses pipes in addition to pipe 14 being connected to the center section of pipe 12, and further yet these pipes are not limited to coming off pipe 12 at a right angle. Any discrete angle is contemplated for these pipes, including pipe 14.

Inside pipe 12 near its longitudinal axial center are located annular steel support rings 28 and 30. These rings are sealably connected to interior pipe 10 on both sides of flow slots 26. During the designed use of this invention, pipe 10 will longitudinally axially slide back and forth somewhat with respect to pipe 12. Hence, there will also be movement of support rings 28 and 30 with respect to pipes 12 and 14 and with respect to the hole cut in pipe 12 around which pipe 14 is welded by welds 16. Support rings 28, 30 are welded far enough back away from this hole so that they do not completely overreach this hole and thereby cut off normal fluid flow passing between flow slots 26 and the interior of pipe 14. Preferably support rings 28 and 30 are located so than they do not even partially overlap this hole.

In any event, annular support rings 28 and 30 extend radially outward until their periphery contacts the interior of pipe 12. These peripheries and the interior of pipe 12 where they contact form slidable contacting surfaces. Annular support ring members 28 and 30 thus provide a means for maintaining pipe 10 concentrically alligned within pipe 12 while also providing a slidable support means for pipe 10 to move longitudinally axially within pipe section 12. Usually there is enough free play along different contacting surfaces of said annular support rings 28, 30 and the interior of pipe wall 12 to allow some of the pressurized fluid flowing between flow slots 26 and pipe 14 to leak over into bellows chambers 32 and 34. This leakage is not necessarily desirable, but if it is going to occur, then it is preferred to control its entry into bellows chambers 32 and 34 in this manner so that the external sides of annular expansion and contraction bellows 36 and 38 rather than their internal sides. Pressure applied to the exterior of said bellows 36 and 38 is less likely to cause the bellows to rupture than is the same pressure applied internally.

Bellows chamber 32 is defined as the annular space existing between pipes 10 and 12 and between end plate 18 and support ring 28.

Similarly, bellows chamber 34 is defined as the annular space existing between pipes 10 and 12 and between end plate 20 and support ring 30.

Flow chamber 40 is defined as the annular space existing between concentric pipes 10 and 12 and between annular support rings 28 and 30.

Bellows 36 is installed in bellows chamber 32. At one end bellows 36 is connected to the interior wall of end plate 18 while at its other end bellows 36 is connected to support ring 28.

Bellows 38 is similarly installed in bellows chamber 34. Bellows 38 is connected at one end to the interior of end plate 20 and at its other end to support ring 30.

It is desired to prevent angular rotation of bellows 36 and 38 about the longitudinal axis of pipe section 12. Prevention of such rotation of support ring 30 is accomplished by the presence of guide bars 42 and guide slots 44. Guide slots 44 are cut in the periphery of support ring 30 to fit around guide bars 42.

Guide bars 42 are round steel bars whose longitudinal axis is aligned parallel to the longitudinal axis of pipe 12, and welded to the inside of pipe wall 12. As support ring 30 moves with respect to pipe 12 it is restricted to longitudinal axial movement only since as its guide slots 44 restrict it to movement along the direction of guide bars 42. Since support ring 30 is rigidly welded to pipe 10, neither can there be any angular rotation of pipe 10 with respect to pipe 12.

Similarly guide slots 46 in support ring 28 and guide bars (not visible) for these slots 46 act between pipe 12 and support ring 28 to prevent angular rotation about the longitudinal axis of pipe section 12 by support ring 28, pipe 10 and bellows 36.

In operation as relative longitudinal axial movement of pipe 10 with respect to pipe 12 occurs one bellows is compressed by this movement and the other is expanded the same amount. All of the forces of pipe expansion and contraction are contained within the expansion joint. This removes the necessity for large, bulky ground anchors and heavy bracing external to the expansion joint. Pipe 14 is usually anchored with only relatively small anchoring equiment for the embodiment shown in FIG. 1 to provide for the fluid thrust caused by the flowing fluid on the closed-end of pipe 10 and to provide for the force required to compress and stretch the annular bellows. But anchoring and bracing is a significantly much smaller problem.

Another feature of this expansion joint is that if a leak does occur in the bellows, a catastrophic rupture does not occur spraying the fluid all over the surrounding area and any personnel who might be present. Rather it provides for a controlled fluid release. This gives pressure sensing and flow control equipment (not shown) located elsewhere in the line time to react and shut the line down before a large volume of product is sprayed over the surrounding area causing unnecessary damage and loss of product. This controlled fluid release is accomplished as follows. Consider bellows 38 for example. The pressurized fluid is external to this bellows but contained by pipe section 12 and end plate 20. If a crack develops in bellows 38 then the fluid can flow into the space inside bellows 38. To escape to the external environment, the fluid has to pass through the narrow gap 25 existing between pipe 10 and the periphery of hole 24 in end plate 20. Design control of the size of this gap controls the rate of fluid release.

Of most significant import, perhaps, is the inclusion of the above features in an expansion joint at which fluid makes a abrupt change of flow direction by the use of only two bellows.

What is claimed is:

1. An internal-bellows, pressure-balanced, angled-flowpath expansion joint which comprises:
   a first conduit member closed off at one end and having flow slots cut in said member near its closed end so that fluid can pass from the interior of said member to its exterior or from its exterior to its interior;
   a second conduit member of larger diameter than the first conduit member and fitted around said first conduit member, said second conduit member being concentric with said first conduit member, both ends of said second conduit member extending past the flow slots cut in said first conduit member, but each end member being on opposite sides of the flow slots and the end nearer the closed end of said first conduit member not extending past said closed-end;
   a third conduit member extending from said second conduit at a definite discrete angle, said third conduit being in fluid communication with the interior of said first conduit through a hole cut in the wall of said second conduit and the flow slots cut in said first conduit so that there can be free flow of a fluid between said first conduit member and said third conduit member, said third conduit being rigidly and sealably connected to said second conduit around the hole cut in said second conduit;

a first and a second annular end member, the first annular end member being rigidly and sealably connected at or near that end of said second conduit member which is closest to the closed-off end of said first conduit member and the second annular end member being connected at or near that end of said second conduit member which is furthest away from the closed-off end of said first conduit member, both of said annular end members extending sufficiently inward from said second conduit member toward said first conduit member until only a small annular gap is left between said first conduit member and each of said annular end members to provide slow controlled leak paths for fluid normally flowing between said first and third conduits should a rupture occur in the bellows defined below, both of which annular end members are axially spaced along said first conduit away from the flow slots cut in said first conduit;

a first and a second annular support ring, the first of which annular support rings is rigidly and sealably connected to and around said first conduit member between the flow slots cut in said first conduit and said first end member, a space being left between said first end member and said first support ring, the second of which annular support rings is rigidly and sealably connected to and around said first conduit member between the flow slots cut in said first conduit member and said second end member, a space being left between said second support ring and said second end member, both of said annular support rings extending outwardly from said first conduit member until they contact the interior wall of said second conduit member and provide slidable contact surfaces for movement of said first conduit member with respect to said second conduit member;

a first annular flexible bellows fitted in the annular space defined by said first and second conduits, said first annular end member, and said first annular support ring, with one end of said first annular bellows connected to said first annular end member and the other end connected to said first annular support ring so that pressurized fluid normally flowing between said first and third conduits which leaks past said slidable contacting surface formed between the external annular surface of said first annular support ring and the internal surface of said second conduit member will pressurize the external surface of said first annular bellows rather than its internal surface;

a second annular flexible bellows fitted in the annular space defined by said first conduit, said second conduit, said second annular end member, and said second annular ring support; one end of said second annular flexible bellows being connected to said second annular end member and the other end connected to said second annular support ring so that any pressurized fluid normally flowing between said first and third conduits which leaks past the slidable contacting surface formed between the interior surface of said second conduit and the external annular surface of said second annular support ring will pressurize the external surface of said second bellows as opposed to its internal surfaces.

2. The expansion joint of claim 1 which further comprises annular slots cut in the periphery of said first and second annular support rings and corresponding guide bars about which said guide slots fit, said guide bars being fastened to the interior of said second conduit member with its longitudinal axis being parallel to the longitudinal axis of said second conduit to prevent angular rotation of said bellows.

3. An internal-bellows, pressure-balanced, angled-flowpath expansion joint which comprises:

a first conduit member having flow slots cut in an annular section of it;

a second conduit member of larger diameter than said first conduit member, said second conduit member being concentrically fitted around said first conduit member at the annular section where said flow slots are cut in said first conduit member, each end of said conduit member extending sufficiently past the ends of said flow slot annular section to accommodate the additional parts described below;

a third conduit member rigidly connected to and extending from said second conduit member at a discrete angle, the connection of said third conduit to second conduit being made around a hole cut in said second conduit to establish fluid communication between said second and third conduits' interiors, the hole in said second conduit member being located in a section of said second conduit which extends substantially radially outward from the annular section in said first conduit containing the flow slots so that fluid communication capability exists between said first and third conduits through said flow slots and through that annular part of the interior of said second conduit which intervenes between said flow slots and said third conduit;

a first and a second annular end member, the first annular end member being rigidly and sealably connected at or near one end of said second conduit member and the second annular end member being rigidly and sealably connected at or near the other end of said second conduit member, both of said annular end members extending inward from said second conduit toward said first conduit member sufficiently until only small annular gaps are left between said first conduit member and each of said first and second annular end member to provide a slow, controlled leak path for fluids normally flowing between said first and third conduits should a rupture occur in the bellows defined below, both of said annular end members being axially spaced away from and on either side of the annular section of first conduit containing the flow slots;

a first and a second annular support ring, both of which rings are rigidly and sealably connected to and around said first conduit member, the first annular end member being located between the first annular end member and the annular section of said first conduit containing the flow slots, the second annular support ring being located between the second annular end member and the annular secton of said first conduit containing the flow slots, each of said supports extending radially outward from said first conduit until they contact the interior wall of said second conduit so as to provide slidable surfaces between their periphery and said second conduit to allow easy longitudinal axial movement of said first conduit with respect to said concentric second conduit;

a first and a second annular flexible bellows both of which are located concentrically with and in the annular space between said first and second conduits, the first bellows being further located in this annular space between said first annular end member and said first annular support ring, one end of said first bellows being sealably connected to said first end member with the other end being sealably connected to said first annular support ring, the second bellows being further located in this annular space between said second annular end members and said second annular support ring, one end of said second bellows being sealably connected to said second end member with the other end being sealably connected to said second annular support ring.

4. The expansion joint of claim 3 which further comprises annular slots cut in the periphery of said first and second annular support rings and corresponding guide bars about which said guide slots fit, said guide bars being fastened to the interior of said second conduit member with its longitudinal axis being parallel to the longitudinal axis of said second conduit to prevent angular rotation of the bellows.

* * * * *